(12) United States Patent
Yeh

(10) Patent No.: US 9,800,505 B2
(45) Date of Patent: Oct. 24, 2017

(54) RELIABILITY EVALUATING METHOD FOR MULTI-STATE FLOW NETWORK WITH LEARNING EFFECT AND NON-TRANSITORY STORAGE DEVICE THEREOF

(71) Applicant: NATIONAL TSING HUA UNIVERSITY, Hsinchu (TW)

(72) Inventor: Wei-Chang Yeh, Hsinchu (TW)

(73) Assignee: National Tsing Hua University, Hsinchu (TW)

(*) Notice: Subject to any disclaimer, the term of this patent is extended or adjusted under 35 U.S.C. 154(b) by 114 days.

(21) Appl. No.: 14/937,381

(22) Filed: Nov. 10, 2015

(65) Prior Publication Data

US 2017/0063694 A1    Mar. 2, 2017

(30) Foreign Application Priority Data

Aug. 25, 2015 (TW) .............................. 104127776 A

(51) Int. Cl.
*H04L 12/803* (2013.01)
*H04L 12/751* (2013.01)
*H04L 12/733* (2013.01)
*H04L 12/721* (2013.01)
*H04L 12/701* (2013.01)

(52) U.S. Cl.
CPC ............ *H04L 47/125* (2013.01); *H04L 45/08* (2013.01); *H04L 45/122* (2013.01); *H04L 45/38* (2013.01); *H04L 45/00* (2013.01)

(58) Field of Classification Search
CPC ....... H04L 45/08; H04L 45/12; H04L 45/122; H04L 45/123; H04L 45/124; H04L 45/127; H04L 45/302; H04L 45/38; H04L 47/125; H04L 45/00; H04L 45/26
See application file for complete search history.

(56) References Cited

U.S. PATENT DOCUMENTS

| 4,905,233 A | * | 2/1990 | Cain | ....................... H04L 45/00 370/237 |
| 2003/0227924 A1 | * | 12/2003 | Kodialam | ............... H04L 45/12 370/395.21 |
| 2006/0227717 A1 | * | 10/2006 | van den Berg | ......... H04L 45/26 370/252 |

* cited by examiner

*Primary Examiner* — Khoa Huynh
(74) *Attorney, Agent, or Firm* — Muncy, Geissler, Olds & Lowe, P.C.

(57) ABSTRACT

A reliability evaluating method for multi-state flow network with learning effect and a non-transitory storage device are provided. The method includes following steps: finding a plurality of minimum paths of the multi-state flow network; each arc of the plurality of minimum paths generating greater a load requirement capacity by the learning effect; judging whether the load requirement capacity is matching the maximum capacity and finding the system state vector; and calculating the reliability of the multi-state flow network as a basis for decision-making.

4 Claims, 4 Drawing Sheets

RELIABILITY EVALUATING METHOD FOR MULTI-STATE FLOW NETWORK WITH LEARNING EFFECT AND NON-TRANSITORY STORAGE DEVICE THEREOF

CROSS-REFERENCE TO RELATED APPLICATION

This application claims the benefit of Taiwan Patent Application No. 104127776, filed on Aug. 25, 2015, in the Taiwan Intellectual Property Office, the disclosure of which is incorporated herein in its entirety by reference.

BACKGROUND OF THE INVENTION

1. Field of the Invention

The present disclosure generally relates to a reliability evaluating method for multi-state flow network and a non-transitory storage device thereof, in particular to a reliability evaluating method for multi-state flow network with learning effect and a non-transitory storage device thereof.

2. Description of the Related Art

Currently, the multi-state flow network may apply a plurality of nodes and arcs connected to the plurality of nodes as the network model. The network model is applied to simulate the practical operation status of the fields related to the computer communication system, transportation communication system, oil/gas production transport system, power delivery system, and so on. Besides, the reliability evaluation of the network is applied to find out the optimal solution so as to provide the system with the decision reference.

The conventional analysis of the multi-state flow network has the limited application. For example, the current multi-state flow network is to assume that the transmission quantity of data or object does not change among nodes and the data quantity of an input node and that of an output node are equal with other. The data quantity does not change when being transmitted through the connected arcs. However, such situation differs from the practical application. In the practical system, the data quantity may have a loss or decrease when being transmitted among the nodes or may have an increase owing to a learning effect. It cannot be maintained in an unchanged situation. As a result, the conventional multi-state flow network fails to reflect the situations occurred in the reality system, and in particular, the situation of an increase of data quantity. So, the conventional reliability evaluation of network indeed has shortcomings.

As a result, the inventor of the present disclosure has been mulling the technical problems over and then therefore designs a reliability evaluating method for multi-state flow network with learning effect and a non-transitory storage device which aim to resolve the existing shortcomings, so as to promote the industrial practicability.

SUMMARY OF THE INVENTION

In view of the aforementioned technical problems, one objective of the present disclosure is to provide a reliability evaluating method for multi-state flow network with learning effect and a non-transitory storage device thereof which aim at resolving the technical problem of the conventional multi-state flow network being incapable of considering an increase of the data quantity resulted from the learning effect.

According to one objective of the present disclosure, it provides a reliability evaluating method for a multi-state flow network with learning effect. The multi-state flow network may include a plurality of nodes and a plurality of arcs connected to the plurality of nodes, and the plurality of nodes may include a source node and a sink node. When a first data flow input to a first node and through a first arc and then arrives at a second node, a second data flow, which arrive at the second node, may be greater than the first data flow due to an increase of the learning effect. The reliability evaluating method may include the following steps: step a. finding out a plurality of minimum paths of the multi-state flow network by a processor; step b. calculating a load requirement capacity of each arc included in the plurality of minimum paths and a possible maximum amount of the arcs of the plurality of minimum paths by the processor according to an initial data flow of the data transmitted from the source node and the learning effect; step c. determining whether an amount of the arcs included in each of the plurality of minimum paths is greater than the possible maximum amount of the arcs by the processor; if yes, recording that the minimum path has been confirmed and then executing step e. and if no, executing step d; step d. determining whether the load requirement capacity of all the arcs included in the plurality of minimum paths is smaller than a maximum load capacity by the processor; if yes, recording the minimum path and a load capacity state of all the arcs included in the minimum path to be a system state vector and recording that the minimum path has been confirmed; if no, recording that the minimum path has been confirmed and then executing step e; step e. determining whether all the plurality of minimum paths have been confirmed by the processor; if yes, executing step f, and if no, repeating steps c and d to the minimum paths of the plurality of minimum paths which have not been confirmed by the processor; and step f. calculating a reliability of the multi-state flow network by the processor according to all the found system state vectors.

Preferably, a relationship between the first data flow d1 and the second data flow d2 may be $d2=d1(k+1)^{\alpha}$, k may denote $k^{th}$ arc of the first arc starting from the source node to the sink node on a transmission path, and α may denote a learning index of the multi-state flow network.

Preferably, the plurality of nodes may include a breaker node, and when the data flow into the breaker node through a second arc, a flow of the data may be maintained steadily and may not increase as the learning effect.

According to the other objective of the present disclosure, it provides a non-transitory storage device feasible to a multi-state flow network with learning effect. The multi-state flow network may include a plurality of nodes and a plurality of arcs connected to the plurality of nodes, the plurality of nodes may include a source node and a sink node. A first data flow input to, a first node and through a first arc and then arrives at a second node, a second data flow, which arrive at the second node, may be greater than the first data flow due to an increase of the learning effect, and the non-transitory storage device storing an algorithm, and the algorithm performing the following steps while being executed by a computer: step a. finding out a plurality of minimum paths of the multi-state flow network; step b. calculating a load requirement capacity of each arc included in the plurality of minimum paths and a possible maximum amount of the arcs of the plurality of minimum paths according to an initial data flow of the data transmitted from the source node and the learning effect; step c. determining whether an amount of the arcs included in each of the plurality of minimum paths is greater than the possible maximum amount of the arcs; if yes, recording that the minimum path has been confirmed and then executing step e, and if no, executing step d; step d. determining whether the load requirement capacity of all the arcs included in the plurality of minimum paths is smaller than a maximum load capacity; if yes, recording the minimum path and a load capacity state of all the arcs included in the minimum path to be a system state vector and recording that the minimum path has been confirmed; if no, recording that the minimum path has been confirmed and then executing step e; step e. determining whether all the plurality of minimum paths have been confirmed; if yes, executing step f, and if no, repeating steps c and d to the minimum paths of the plurality of minimum paths which have not been confirmed; and step f. calculating a reliability of the multi-state flow network according to all the found system state vectors.

Preferably, a relationship between the first data flow d1 and the second data flow d2 is $d2=d1(k+1)^\alpha$, k may denote $k^{th}$ arc of the first arc starting from the source node to the sink node on a transmission path, and $\alpha$ may denote a learning index of the multi-state flow network.

Preferably, the plurality of nodes may include a breaker node, and when the data flow into the breaker node through a second arc, a flow of the data may be maintained steadily and may not increase as the learning effect.

As mentioned previously, a reliability evaluating method for multi-state flow network with learning effect and a non-transitory storage device thereof of the present disclosure may have one or more advantages as follows.

1. By means of determining the influence upon the data flow resulted from an increase of the learning effect, a reliability evaluating method for multi-state flow network with learning effect and a non-transitory storage device thereof of the present disclosure are capable of matching the practical operation status of the multi-state flow network.

2. A reliability evaluating method for multi-state flow network with learning effect and a non-transitory storage device thereof of the present disclosure apply the calculation of the reliability of the multi-state flow network as a basis for decision-making.

3. By disposing the breaker nodes, a reliability evaluating method for multi-state flow network with learning effect and a non-transitory storage device thereof of the present disclosure are capable of decreasing the increase of the data adequately so as to avoid the overloading of the multi-state flow network.

DETAILED DESCRIPTION OF THE PREFERRED EMBODIMENTS

In order to facilitate the understanding of the technical features, the contents and the advantages of the present disclosure, and the effectiveness thereof that can be achieved, the present disclosure will be illustrated in detail below through embodiments with reference to the accompanying drawings. On the other hand, the diagrams used herein are merely intended to be schematic and auxiliary to the specification, but are not necessary to be true scale and precise configuration after implementing the present disclosure. Thus, it should not be interpreted in accordance with the scale and the configuration of the accompanying drawings to limit the scope of the present disclosure on the practical implementation.

In accordance with the embodiment(s) of the present disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
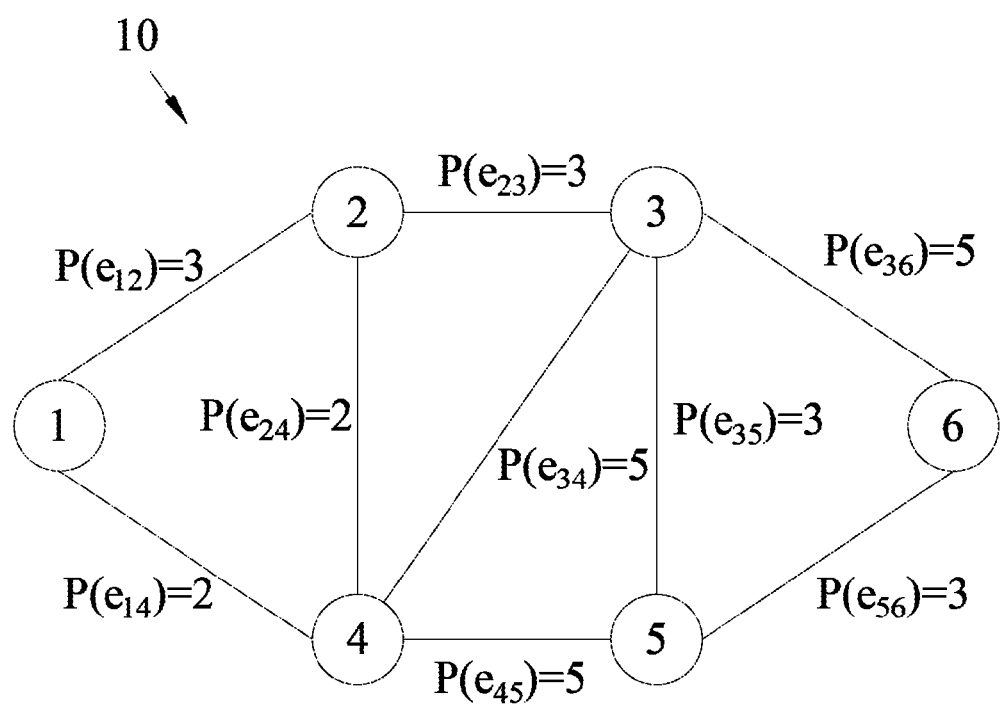
FIG. 1 is a schematic diagram of a multi-state flow network with learning effect of the present disclosure.

Please refer to FIG. 1 which is a schematic diagram of a multi-state flow network with learning effect of the present disclosure. Various aspects of a network model of a multi-state flow network 10 is demonstrated by G (V, E, W), wherein V={1, 2, . . . 6} is a node set of the multi-state flow network 10, and an amount of the nodes is 6. These nodes are disposed with source nodes and sink nodes which are transmitted thereto. As shown in FIG. 1 the node 1 is a source node of the multi-state flow network 10, and the node 6 is a sink node of the multi-state flow network 10. Flows of data of objects flows from the source node to the sink node. $E=\{e_{12}, e_{14}, e_{23}, e_{24}, e_{34}, e_{35}, e_{36}, e_{45}, e_{56}\}$ is the arc for connecting the six nodes, and the arc $e_{12}$ connects the node 1 and the node 2 and the remainders are denoted in a similar way. As each of the arcs are connected with each other via the nodes, so that a plurality of minimum paths from the source node to the sink node are generated, and data can be transmitted from the source node to the sink node through the plurality of minimum paths. Take a computer or a connection system as an example, each node may be a host or a network transmission device used to transmit information or commands, and the information or the commands may be transmitted to the sink node through a cable or a wireless transmission mode. However, when the information or the commands are transmitted on the transmission paths, no matter a cable or a wireless transmission mode, generation of noise is unavoidable, such that an extra information load becomes necessary while transmitting the data. Consequently, when the multi-state flow network 10 is applied to analyze the transmission reliability, an increase of the flow has to be taken into the consideration. $W=\{P(e_{12}), P(e_{14}), \ldots, P(e_{56})\}$ indicates a maximum capacity when each arc is being transmitted, and $P(e_{12})$ is denoted that the maximum capacity of the arc between the node 1 and the node 2 is 2. The remainders are denoted in the similar way.

Figure 2:
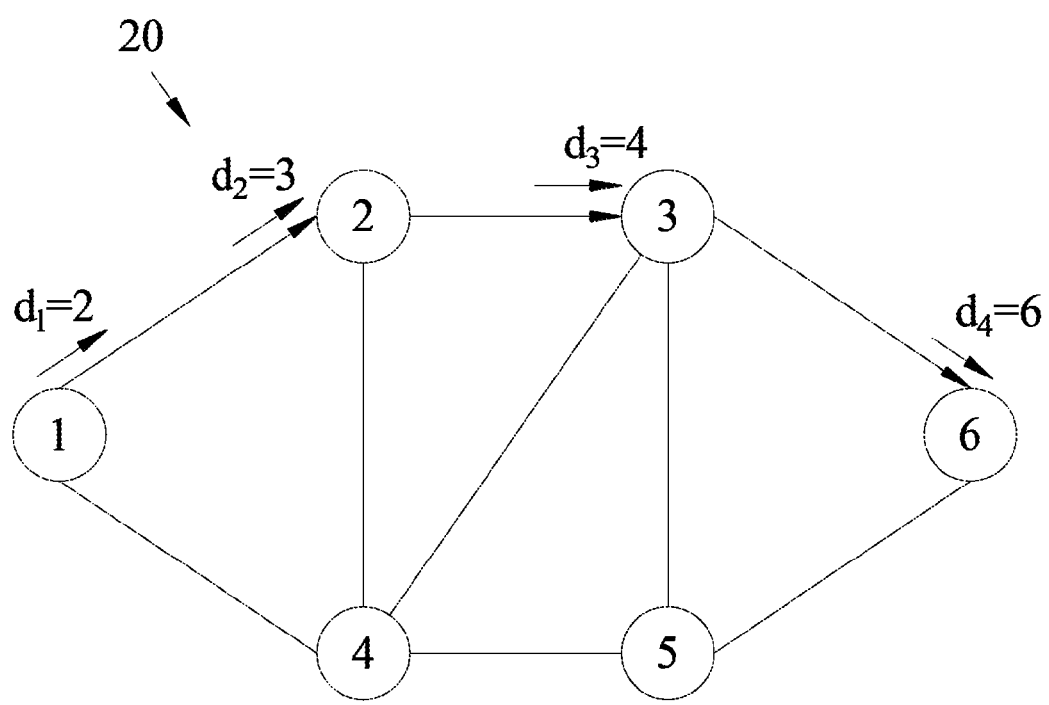
FIG. 2 is a schematic diagram of an embodiment of a multi-state flow network with learning effect of the present disclosure.

Please refer to FIG. 2 which is a schematic diagram of an embodiment of a multi-state flow network with learning effect of the present disclosure. The establishment of a multi-state flow network 20 is as mentioned above, and can be simulated as the data transmitted in a computer or a communication network. Take one of the transmission paths (nodes 1-2-3-6) for example; if a data quantity 2 inputted to the node 1 is 2, the data quantity from the node 2, node 3 and the sink node 6 is 2 respectively according to the setting of the conventional flow network. That is, the law of conservation of energy is satisfied. In the practical system, the transmission arcs ($e_{12}$, $e_{23}$, $e_{36}$) among the nodes may have a learning effect, so that the data quantity increases in the process of the transmission. When an initial data flow is inputted and a first data flow d1 flows from the node 1 to the arc $e_{12}$ and arrives at the node 2, the initial data flow is increases to a second data flow d2 due to the learning effect. The learning effect can be calculated according to the following formula.

$$d2=d1(k+1)^\alpha \quad (1)$$

Regarding the aforementioned formula, k denotes that the first arc on the transmission path (the nodes 1-2-3-6) starting from the source node to the sink node is arc $e_{12}$. $\alpha$ is a learning index of the multi-state flow network, and can be set as 0.322. If the first data flow d1 is 2, the second data flow d2 increases as $2(1+1)^{0.322}=2.5$, and the rest may be deduced by analogy. After the learning effect, a third data flow d3 flowing to the node 3 is $2.5(2+1)^{0.322}=3.56$, and a fourth data flow d4 flowing to the node 6 is $3.56(3+1)^{0.322}=5.56$. Here, the arcs among the nodes are served as the learning effect, and the changes related the inflow and outflow of the nodes is not taken into account. Besides, if an object is transmitted, an integer number which is greater than a calculated value is applied as the basis for decision-making, and as a result, d2=3, d3=4, and d4=6. As the multi-state flow network 20 is arranged according to the aforementioned establishment, the arcs ($e_{12}$, $e_{23}$, $e_{36}$) also have the maximum transmission capacity. As mentioned above, if the fourth data flow d4 exceeds in the maximum capacity of the multi-state flow network 20, the transmission of data fails. Consequently, such transmission path (the nodes 1-2-3-6) is incapable of being an effective minimum path when evaluating the network reliability. The following paragraphs will detail the reliability evaluating method for multi-state flow network with learning effect of the present disclosure.

Figure 3:
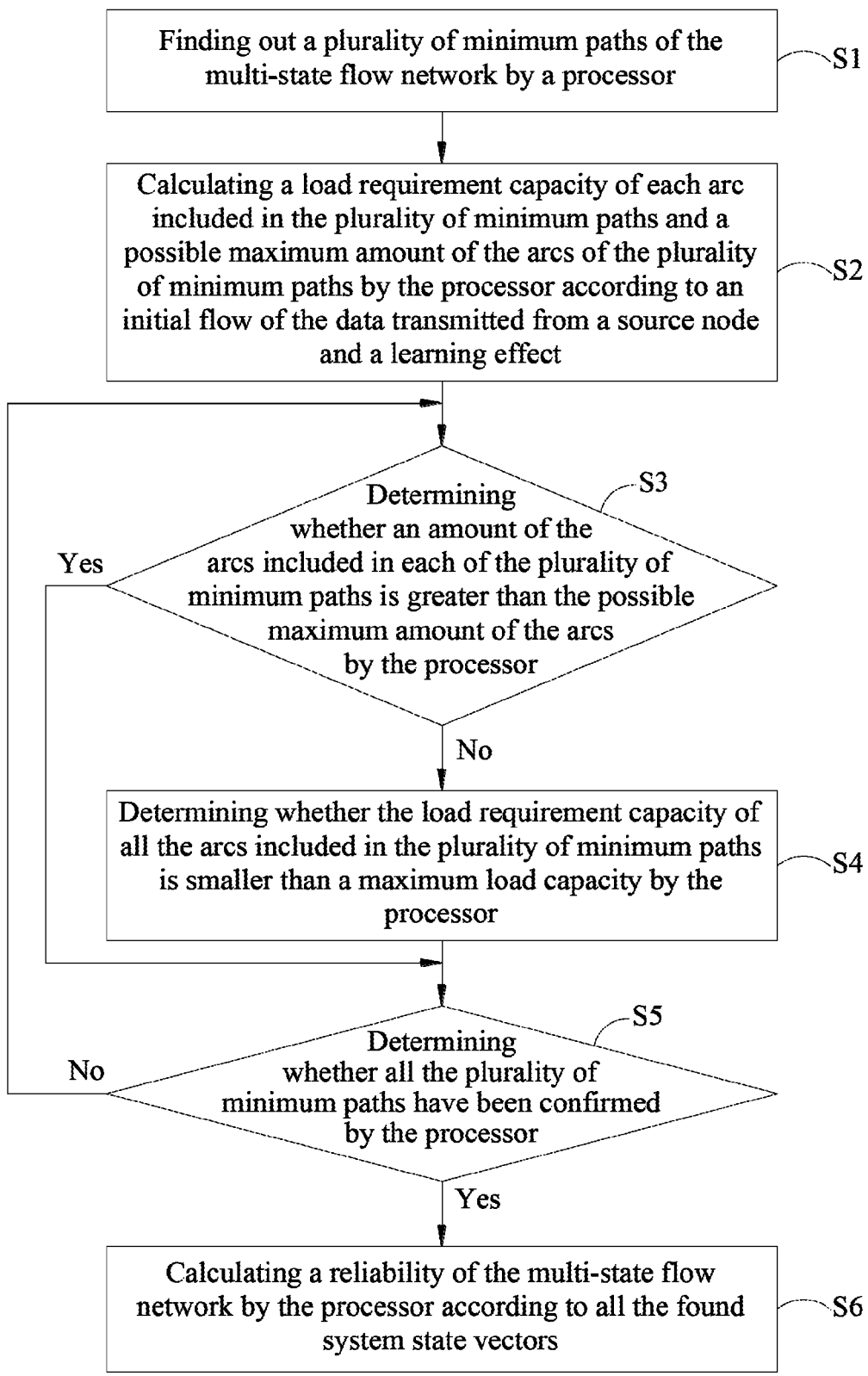
FIG. 3 is a flow chart of a reliability evaluating method for multi-state flow network with learning effect of the present disclosure.

Please refer to FIG. 3 which is a flow chart of a reliability evaluating method for multi-state flow network with learning effect of the present disclosure. As shown in the figure, a reliability evaluating method for multi-state flow network with learning effect of the present disclosure includes the following steps (S1-S6).

Step S1: Finding a plurality of minimum paths of a multi-state flow network by a processor. Without considering a learning effect, a conventional calculation method of flow network model is applied to find out all the minimum paths. The method can be referred to W. C. Yeh, Search for all d-Mincuts of a limited-flow network, Computers & Operations Research, 29(2002), 1843-1858. As the multi-state flow network 10 shown in FIG. 1, the plurality of minimum paths thereof are $P_1=e_{1236}$, $P_2=e_{14236}$, $P_3=e_{1436}$, $P_4=e_{12436}$, $P_5=e_{14536}$, $P_6=e_{124536}$, $P_7=e_{1456}$, $P_8=e_{12456}$, $P_9=e_{123456}$, $P_{10}=e_{12356}$, $P_{11}=e_{142356}$, $P_{12}=e_{14356}$ and $P_{13}=e_{124356}$. Here, $P_1=e_{1236}$ denotes the data starting from the node 1, through the node 2, the node 3 and then arriving at the node 6 via the arcs ($e_{12}$, $e_{23}$, $e_{36}$) that is mentioned above. The rest may be deduced by analogy, and the effect upon each minimum path resulted from the learning effect is detailed as follows.

Step S2: Calculating a load requirement capacity of each arc included in the plurality of minimum paths and a possible maximum capacity of the plurality of minimum paths by the processor according to an initial flow of the data transmitted from a source node and a learning effect when the initial flow has the plurality of minimum paths. Here, it is to find out a possible maximum amount of the arcs according to the plurality of minimum paths found in the previous step. The possible maximum amount of the arcs is 5 according to the aforementioned embodiment. In addition, the load requirement capacity of each arc is calculated according to the formula (1). As shown in FIG. 2, the load requirement capacity of the arc $e_{12}$ is a second data flow d2=3, and the remainders are denoted in the similar way.

Step S3: Determining whether an amount of the arcs included in each of the plurality of minimum paths is greater than the possible maximum amount of the arcs by the processor. It is to determine whether the amount of the arcs transmitted in each of the plurality of minimum paths is greater than the possible maximum amount of the arcs. If the amount of the arcs is greater than the maximum possible amount of the arcs, it is to record that the minimum path is confirmed and then to execute step S5. To the contrary, step S4 is executed.

Step S4: Determining whether the load requirement capacity of all the arcs included in the plurality of minimum paths is smaller than a maximum load capacity by the processor. When the amount of the arcs transmitted in the minimum path is smaller than the maximum possible amount of the arcs, it is to determine whether the load requirement capacity produced by the learning effect is satisfied with the original maximum load capacity. For example, the load requirement capacity of the arc $e_{12}$ is d2=3 that satisfies with the original maximum load capacity $P(e_{12})=3$, and the load requirement capacity of the arc $e_{36}$ exceeds in the original maximum load capacity $P(e_{36})=3$. So, $P_1=e_{1236}$ cannot match the multi-state flow network, and it is to record that the minimum path has been confirmed and then to execute step S5. If the load requirement capacity is all smaller than the maximum load capacity, the minimum path is regarded as satisfying with the multi-state flow network. Afterwards, it is to record the minimum path, and beside, the load capacity of all the arcs included in the minimum path, which is a system state sector recorded according to the initial flow, is also recorded that the minimum path has been confirmed.

Step S5: Determining whether all the plurality of minimum paths have been confirmed by the processor. It is to determine whether all the minimum paths through the learning effect have been determined and then recorded. If yes, it turns to step S6, and if no, it returns to step S3 to confirm the minimum paths which haven't been determined.

Step S6: Calculating a reliability of the multi-state flow network by the processor according to all the found system state vectors. In the foregoing steps, the system state of the minimum path which has been determined satisfying with the multi-state flow network is calculated by the reliability of a reliability evaluating system for multi-state flow network so as to be served as the basis for decision-making for determining the multi-state flow network system. The reliability can be obtained through the following formulae.

$$R_{d-LP} = Pr\left(\bigcup_{i=1}^{\delta} X_i\right) ==$$

$$\sum_{i=1}^{\delta} Pr(X_i) - \sum_{j=2}^{\delta}\sum_{i=1}^{j-1} Pr(X_i \cap X_j) + (-1)^{\delta-1} Pr(X_1 \cap X_2 \cap \ldots \cap X_{\delta})$$

$$Pr(X) = \prod_{i=1}^{m} Pr(\{x_i^* \mid x_i \le x_i^* \le W(e_i) \text{ and } X = (x_1, x_2, \ldots, x_m)\})$$

Here, $X=(x_1, x_2, \ldots, x_m)$ is the system state vector which satisfies with the minimum path of the multi-state flow network.

In addition to the forgoing embodiments, partial nodes among the nodes can be served as breaker nodes in order to prevent the flow exceeding in the maximum capacity of the original network frame because of the learning effect. Please refer to FIG. 1 again. The node 2 is served as a breaker node. When the first data flow d1 flows from the arc $e_{12}$ to the node 2, the image of the learning effect enables the first data flow d1 increasing to the second flow d2. When the breaker node is disposed, the first data flow is equal to the second data flow d2, that is, the flow of the data, which comes from the node 2, is not changed. Such disposition is similar to the noise filtering device of the practical system. Filtering the noise increased in the data can prevent the increase of the transmission capacity affecting the transmission quality of the system. Calculating the network reliability disposed with the breaker node can be referred to the foregoing steps. The difference only lies that calculations of the load requirement capacity of each of the arcs are different. When the minimum path passes through the breaker node, the learning effect does not cause any effects, so that basis of the calculation of the load capacity has to be changed correspondingly to the amount of the arcs.

Figure 4:
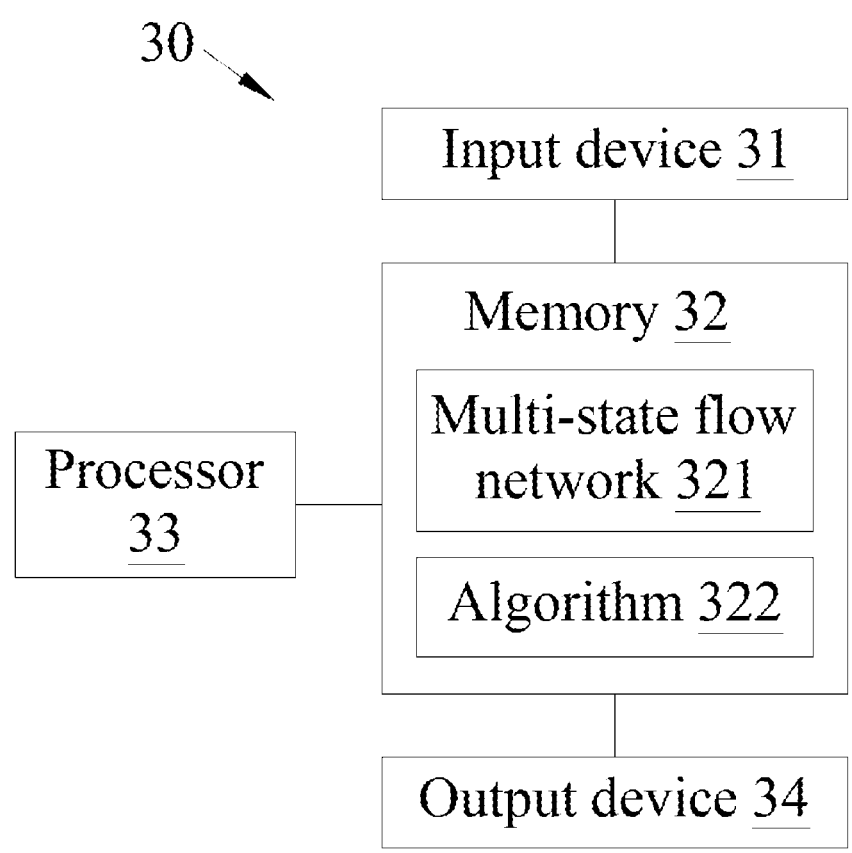
FIG. 4 is a schematic diagram of a reliability evaluating system for multi-state flow network with learning effect of the present disclosure.

Please refer to FIG. 4 which is a schematic diagram of a reliability evaluating system for multi-state flow network with learning effect of the present disclosure. As shown in the figure, a reliability evaluating system for multi-state flow network with learning effect 30 includes an input device 31, a memory 32, a processor 33 and an output device 34. Here, the input device 31 is connected to the memory 32 and may include various induction type or touch type input interfaces. The structure of the nodes and the arcs of a multi-state flow network 321 are set by the input device 31, and the memory 32 stores an algorithm 322 including the aforementioned reliability evaluating method. The processor 33 is connected to the memory 32 to access the multi-state flow network 321 and the algorithm 322 stored in the memory 32, which may be a non-transitory storage device, so as to execute the calculation of the evaluation and analysis as shown in FIG. 3. In practice, the processor 33 executes the algorithm 322 stored in the memory 32, and applies the commands included each step to calculate the increased data quantity in each minimum path resulted from the learning effect. Hereby, it is to find out all the solutions which satisfy with the multi-state flow network 321 by determining whether the increased data quantity exceeds in the maximum load capacity, so as to evaluate the probability of each solution to obtain the reliability of the entire network. The calculation result derived from the processor 33 is outputted by the output device 34. The output device 34 may be a display for displaying the evaluation result, such as LCD, LED, OLED, and so on, and alternatively, the output device 34 may be a cable or a wireless network transmitter which transmits the evaluation result to a user at a remote end. Hereby, the reliability is applied to evaluate the probable result produced in the process of the system.

While the means of specific embodiments in present disclosure has been described by reference drawings, numerous modifications and variations could be made thereto by those skilled in the art without departing from the scope and spirit of the invention set forth in the claims. The modifications and variations should in a range limited by the specification of the present disclosure.

What is claimed is:

1. A reliability evaluating method for a multi-state flow network with learning effect, the multi-state flow network comprising a plurality of nodes and a plurality of arcs connected to the plurality of nodes, and the plurality of nodes comprising a source node and a sink node, wherein an first data flow inputs to a first node and through a first arc and then arrives at a second node, and a second data flow, which arrives at the second node, is greater than the first data flow due to an increase of the learning effect, and the reliability evaluating method comprising following steps:

Step a. finding out a plurality of minimum paths of the multi-state flow network by a processor and disposing breaker nodes among the plurality of nodes, wherein when the data flow into the breaker node through a second arc, a flow of the data is maintained steadily to avoid overloading the multi-state flow network due to the learning effect;

Step b. calculating a load requirement capacity of each arc included in the plurality of minimum paths and a possible maximum amount of the arcs of the plurality of minimum paths by the processor according to an initial data flow transmitted from the source node and the learning effect;

Step c. determining whether an amount of the arcs included in each of the plurality of minimum paths is greater than the possible maximum amount of the arcs by the processor; if yes, recording that the minimum path has been confirmed and then executing step e, and if no, executing step d;

Step d. determining whether the load requirement capacity of all the arcs included in the plurality of minimum paths is smaller than a maximum load capacity by the processor; if yes, recording the minimum path and a load capacity state of all the arcs included in the minimum path to be a system state vector and recording that the minimum path has been confirmed; if no, recording that the minimum path has been confirmed and then executing step e;

Step e. determining whether all the plurality of minimum paths have been confirmed by the processor; if yes, executing step f, and if no, repeating steps c and d to the minimum paths of the plurality of minimum paths which have not been confirmed by the processor; and Step f. calculating a reliability of the multi-state flow network by the processor according to all the found system state vectors.

2. The reliability evaluating method for multi-state flow network with learning effect of claim 1, wherein a relationship between the first data flow d1 and the second data flow d2 is $d2=d1(k+1)^{\alpha}$, k denotes $k^{th}$ arc of the first arc starting from the source node to the sink node on a transmission path, and $\alpha$ denotes a learning index of the multi-state flow network.

3. A non-transitory storage device for evaluating reliability of a multi-state flow network with learning effect, the multi-state flow network comprising a plurality of nodes and a plurality of arcs connected to the plurality of nodes, the plurality of nodes comprising a source node and a sink node, wherein a first data flow inputs to a first node and through a first arc and then arrives at a second node, a second data flow, which arrives at the second node, is greater than the first data flow due to an increase of the learning effect, and the non-transitory storage device storing an algorithm, and the algorithm performing the following steps while being executed by a computer:

Step a. finding out a plurality of minimum paths of the multi-state flow network, and disposing breaker nodes among the plurality of nodes, wherein when the data flow into the breaker node through a second arc, a flow of the data is maintained steadily to avoid overloading the multi-state flow network due to the learning effect;

Step b. calculating a load requirement capacity of each arc included in the plurality of minimum paths and a possible maximum amount of the arcs of the plurality of minimum paths according to an initial data flow transmitted from the source node and the learning effect;

Step c. determining whether an amount of the arcs included in each of the plurality of minimum paths is greater than the possible maximum amount of the arcs; if yes, recording that the minimum path has been confirmed and then executing step e, and if no, executing step d;

Step d. determining whether the load requirement capacity of all the arcs included in the plurality of minimum paths is smaller than a maximum load capacity; if yes, recording the minimum path and a load capacity state of all the arcs included in the minimum path to be a system state vector and recording that the minimum path has been confirmed; if no, recording that the minimum path has been confirmed and then executing step e;

Step e. determining whether all the plurality of minimum paths have been confirmed; if yes, executing step f, and if no, repeating steps c and d to the minimum paths of the plurality of minimum paths which have not been confirmed; and Step f. calculating a reliability of the multi-state flow network according to all the found system state vectors.

4. The non-transitory storage device of claim 3, wherein a relationship between the first data flow d1 and the second data flow d2 is $d2=d1(k+1)^\alpha$, k denotes $k^{th}$ arc of the first arc starting from the source node to the sink node on a transmission path, and $\alpha$ denotes a learning index of the multi-state flow network.

* * * * *